United States Patent
Wetzel et al.

[15] 3,696,410
[45] Oct. 3, 1972

[54] HORN WITH BUZZER

[72] Inventors: William C. Wetzel, 260 State Park Drive; Raymond W. Long, 1017 Taylor St., both of Bay City, Mich. 48706

[22] Filed: Feb. 17, 1971

[21] Appl. No.: 116,189

[52] U.S. Cl. .................. 340/393, 340/396, 340/388
[51] Int. Cl. ............................................. G10k 9/00
[58] Field of Search........ 340/384, 388, 393, 396, 62, 340/404

[56] References Cited

UNITED STATES PATENTS

| | | |
|---|---|---|
| 2,140,577 | 12/1938 | Gaynor...................340/393 |
| 2,682,655 | 6/1954 | Grohsgal..................340/393 |
| 2,573,924 | 11/1951 | Miller.........................340/393 |

*Primary Examiner*—John W. Caldwell
*Assistant Examiner*—William M. Wannisky
*Attorney*—D. Henry Stoltenberg

[57] ABSTRACT

A signaling device which produces a loud signal for distant warning of persons distant from the automotive vehicle and a soft signal for persons near or within the automotive vehicle under controlled conditions. The loud signal is under the control of the driver with the soft signal being under control of selected safety functions.

4 Claims, 5 Drawing Figures

PATENTED OCT 3 1972　　　　　　　　　　3,696,410
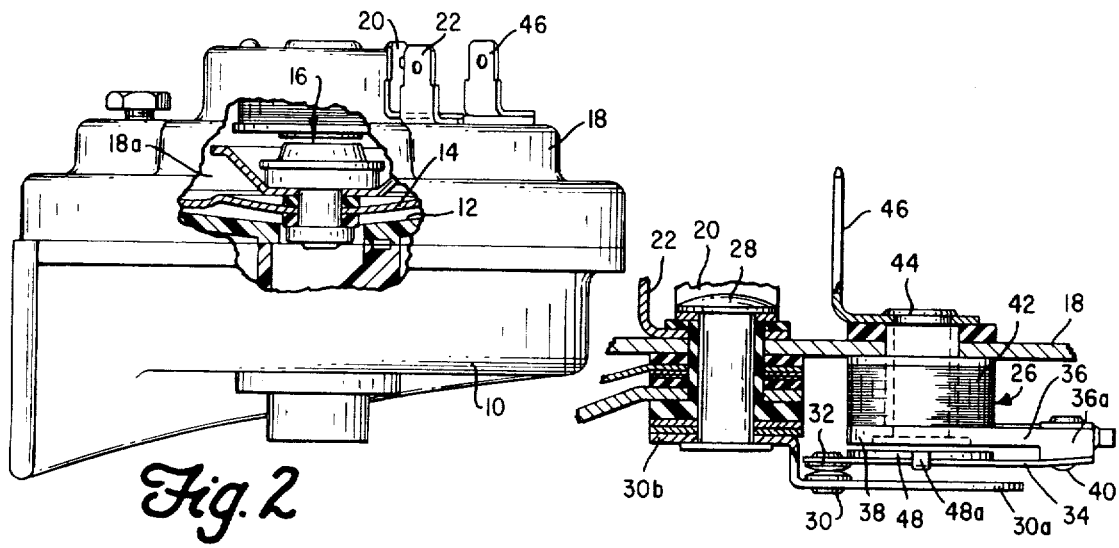
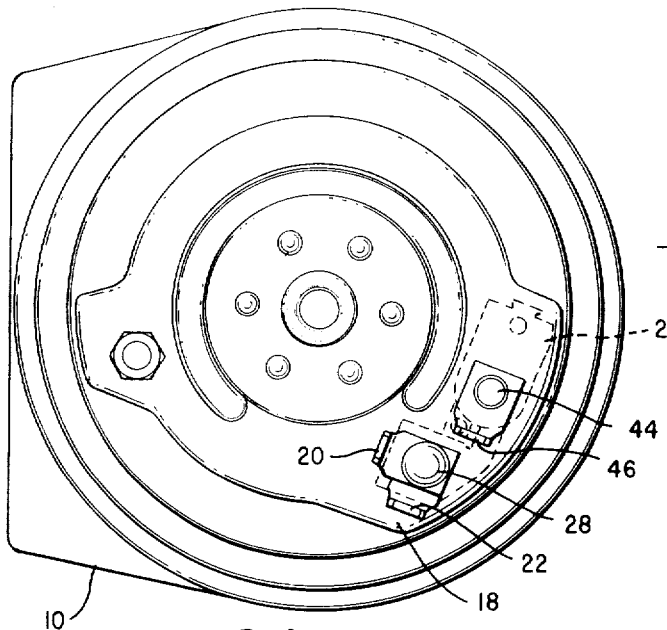
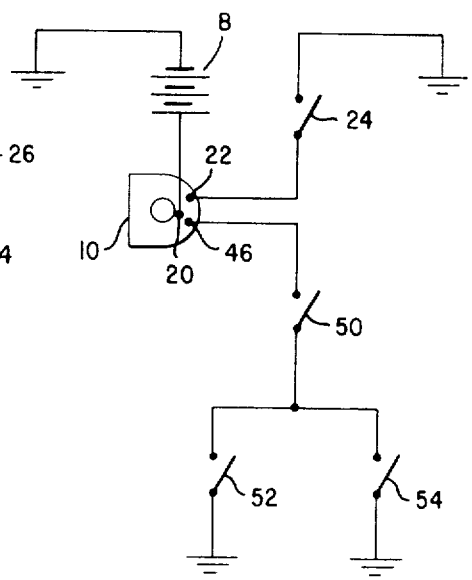
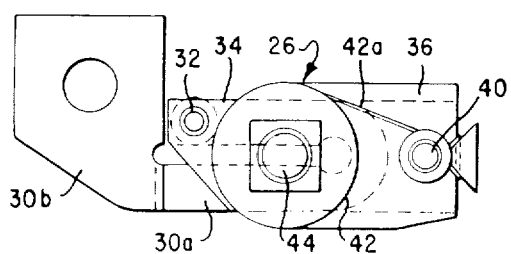
INVENTORS.
WILLIAM C. WETZEL
RAYMOND W. LONG
BY
Henry Stollenberg
ATTORNEY 3,696,410

HORN WITH BUZZER

BACKGROUND OF THE INVENTION

With the increase of theft of automotive vehicles by juveniles and others, due to the carelessness of drivers by leaving keys in the ignition lock, and the increase of thievery by taking of articles in the automobile again due to carelessness by not locking the doors thereof, automobile manufactures have been adding signalling devices to warn the driver of unfulfilled safety functions, usually in the form of a buzzer which is activated when certain selected safety functions have not been performed, such as removing the ignition key from the ignition lock or failure to lock the doors of the automobile upon leaving the same in parked position. The present invention contemplates the provision of a warning device such as a buzzer integrated with the conventional airhorn whereby a cheaper device is made available and also one which is incased in the horn housing for protection from atmospheric conditions for greater durability. At the same time, the diaphragm and housing arrangements of the conventional horn amplify the warning sounds to make the warning signal more audible to the driver and therefore of greater efficacy to attain the desired end.

SUMMARY OF THE INVENTION

It is therefore a principal object of this invention to provide a dual function warning device, which will emit a loud warning signal for distant persons under the control of the operator of an automotive vehicle, and which will emit a soft warning signal for warning the operator of the automotive vehicle that selected safety functions have not been performed under selected conditions.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

BRIEF DESCRIPTION OF THE DRAWING

FIG. 1, is a plan view of a conventional horn showing the position of the warning device incorporating the invention.

FIG. 2, is an elevational view partly in section of the horn shown in FIG. 1.

FIG. 3, is an enlarged elevational view showing the parts of the warning device shown in FIG. 1.

FIG. 4, is an enlarged plan view of the warning device shown in FIG. 3; and

FIG. 5, is a schematic diagram of connections of both warning devices with the switches cooperating with the selected safety functions.

DESCRIPTION OF THE PREFERRED EMBODIMENT

Referring to the drawings particularly FIGS. 1 and 2, a conventional air horn is shown, which consists of a resonating air chamber 10, a front face plate 12, a vibratory diaphragm 14 cooperating with the face plate 12, and electromagnetic motor mechanism 16 positioned in a housing member 18. The motor mechanism 16 drives the vibratory diaphragm to create an air note which is under the control of an operator of an automotive vehicle on which the horn is mounted to give a warning signal to persons at some distance from the automotive vehicle. The loudness of the warning signal given may be a high as 130 decibels when measured under standard manufacturing procedures and may therefore be heard by persons at a considerable distance from the vehicle.

The motor mechanism 16 is mounted in a protective chamber 18a formed between the housing member 18 and the diaphragm 14 with the face plate 18, all as described and claimed in application Ser. No. 760,412, filed Sept. 18, 1968, which has matured into U.S. Pat. No. 3,562,748 assigned to the same assignee. Connection to a source of electrical power such as a battery B for the air horn is made by terminals 20 and 22 connected in circuit as shown schematically in FIG. 5, in series circuit with horn button 24 which places the operation of the air horn under the control of the operator of the motor vehicle. In the protective chamber 18a, a second vibratory device 26 is mounted as shown in plan view in FIG. 1 and in enlarged views in FIGS. 3 and 4. The vibratory device is essentially a buzzer whose armature oscillations cause a warning sound of relatively low volume, intended to warn persons very near or in the automotive vehicle that some safety function has not been performed which should be performed for the sake of safety. The fact that the buzzer is mounted in the interior of the main horn body in the chamber 18a not only protects the elements of the device from atmospheric conditions but also causes substantial amplification of the sound.

The terminals 20 and 22 for the air horn are attached to the housing 18 by rivet 28 in a conventional circuit which energizes the horn elements from the battery B when the operator closes horn switch 24 as shown in FIG. 5. The rivet 28 also attaches the fixed contact 30 of the vibratory buzzer 26 to the housing 18 as shown in FIG. 3, the contact 30 being mounted on the end of a U-shaped spring member 30a, the other end being provided with an upwardly displaced head 30b which cooperates with the rivet 28. The rivet 28 placed the contact 30 in circuit with the battery B via the terminal 20 as seen in FIG. 5.

The movable contact 32 is mounted on the end of a spring strip 34 anchored on a lateral projection 36 of a molded insulating core 38 by a rivet 40. The projection 36 is provided with a raised portion 36a whose terminal surface is obliquely slanted where it cooperates with the strip 34 whereby the movable contact 32 is resiliently urged toward the fixed contact 30. The insulating core 38 is shaped as a spool to hold an electromagnetic actuating coil 42, all being mounted on the housing 18 by magnetic rivet 44 insulated therefrom in a conventional manner. The rivet 44 also affixes the terminal 46 which is in electrical circuit with the rivet and also with one end of the coil 42. The other end 42a of the coil 42 is in circuit with the rivet 40 and with the movable contact 32 so that when the coil 42 is energized from the battery B, an armature 48 is attracted by the magnetic field created by the coil to move the movable contact 32 upwardly to open the coil circuit. The armature 48 is attached to the spring 34 by bent lugs 48 a as shown in FIG. 3. This action causes vibratory motion of the armature 48 for the spring strip 34 and will again close the contacts 30 and 32 by its resilient bias when the circuit through the coil 42 is broken. This creates a buzzing sound which is amplified by the housing 18 and also by the diaphragm 14 to warn the operator of some safety function which must be performed by him.

Switches 50, 52 and 54 shown in FIG. 5 may be opened or closed as the situation warrants by some safety function which must be performed by the operator and may consist of various elements for performance, such as removal of the key from the ignition switch, turning out of lights, locking of doors and the like safety functions which should be performed by the operator of the automotive vehicle.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

We claim:

1. A signaling device comprising, in combination, a housing, a movable flexible diaphragm extending across the interior of said housing to define a resonant air space therein, a first vibratory means located within said air space and directly secured to said diaphragm to vibrate said diaphragm along a vibratory axis generally normal to said diaphragm to provide an audible signal of relatively high volume, a second vibratory means located within said air space but not directly secured to said diaphragm, said second vibratory means positioned to vibrate within said air space on an axis parallel to the vibratory axis of said diaphragm to provide an audible signal of relative low volume, and first and second magnetic means connected respectively to said first and second vibratory means for causing the latter to vibrate upon energizing said magnetic means.

2. The signaling device of claim 1 wherein said first and second magnetic means are electrical coils secured directly to said housing with the axes of said coils being parallel.

3. A dual signal horn and buzzer for automotive use comprising, in combination, a housing, a movable flexible diaphragm extending across the interior of said housing to define a resonant air space therein, a first magnetically driven vibrator located within said air space and directly secured to said diaphragm to vibrate said diaphragm on a vibratory axis generally normal to said diaphragm to create an audible signal of relatively high volume, a second magnetically driven vibrator located within said air space but not directly secured to said diaphragm and positioned to vibrate entirely within said air space to create an audible signal of relatively low volume, and electrical means for applying energy to each of first and second magnetically driven vibrators.

4. The dual signal horn and buzzer of claim 3 wherein said first and second magnetic vibrators are electrical coils secured directly to said housing with the axes of said coils being parallel.

* * * * *